US012744568B2

(12) United States Patent
Nilsson

(10) Patent No.: US 12,744,568 B2
(45) Date of Patent: Sep. 22, 2026

(54) BEAM SELECTION SYSTEMS AND METHODS

(71) Applicant: Telefonaktiebolaget LM Ericsson (publ), Stockholm (SE)

(72) Inventor: Andreas Nilsson, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 697 days.

(21) Appl. No.: 16/349,484

(22) PCT Filed: Apr. 30, 2019

(86) PCT No.: PCT/EP2019/061029
§ 371 (c)(1),
(2) Date: May 13, 2019

(87) PCT Pub. No.: WO2020/221438
PCT Pub. Date: Nov. 5, 2020

(65) Prior Publication Data
US 2021/0337397 A1 Oct. 28, 2021

(51) Int. Cl.
*H04B 7/06* (2006.01)
*H04W 16/28* (2009.01)
(Continued)

(52) U.S. Cl.
CPC .......... *H04B 7/0617* (2013.01); *H04W 16/28* (2013.01); *H04W 52/367* (2013.01); *H04W 52/42* (2013.01)

(58) Field of Classification Search
CPC .... H04W 16/28; H04W 52/367; H04W 52/42
See application file for complete search history.

(56) References Cited

U.S. PATENT DOCUMENTS 5,809,422 A * 9/1998 Raleigh ................ H04B 7/2609 455/449
7,245,880 B1 * 7/2007 Jacobsen ............... H04W 52/42 370/318

(Continued)

FOREIGN PATENT DOCUMENTS

CN 107852212 A 3/2018
CN 109155659 A 1/2019

(Continued)

OTHER PUBLICATIONS

Guerreiro et al., Power-Efficient Beam Sweeping for Initial Synchronization in mm-Wave Wireless Networks, 2015, IEEE 16th International Workshop on Signal Processing Advances in Wireless Communications (Year: 2015).*

(Continued)

*Primary Examiner* — Noel R Beharry
*Assistant Examiner* — Rodrick Mak
(74) *Attorney, Agent, or Firm* — Rothwell, Figg, Ernst & Manbeck, P.C.

(57) ABSTRACT

A UE determines P-MPR for different candidate UE beams. Then, during a P2 beam sweep, instead of the UE generating as wide UE RX beam as possible, the UE consider the determined P-MPR for the candidate UE beams and generates a UE RX beam with as large beamwidth as possible, but with the condition to reduce the antenna gain in directions of the UE beams with large P-MPR.

26 Claims, 9 Drawing Sheets

(51) Int. Cl.
*H04W 52/36* (2009.01)
*H04W 52/42* (2009.01)

(56) References Cited

U.S. PATENT DOCUMENTS

| | | | | |
|---|---|---|---|---|
| 8,442,141 | B1 * | 5/2013 | Zhang | H04L 1/06 375/267 |
| 10,812,125 | B1 * | 10/2020 | Badic | H04B 7/0874 |
| 11,901,998 | B2 * | 2/2024 | Wang | H04W 16/28 |
| 2003/0092379 | A1 * | 5/2003 | Brothers, Jr. | H04B 7/0608 455/12.1 |
| 2006/0013290 | A1 * | 1/2006 | Oura | H04B 1/7113 375/148 |
| 2006/0164969 | A1 * | 7/2006 | Malik | H04W 16/28 370/203 |
| 2010/0124930 | A1 * | 5/2010 | Andrews | H04J 11/005 455/447 |
| 2012/0281568 | A1 * | 11/2012 | Ho | H04W 52/365 370/252 |
| 2013/0142128 | A1 * | 6/2013 | Yang | H04W 52/0238 370/329 |
| 2013/0328723 | A1 * | 12/2013 | Rappaport | H01Q 1/245 342/372 |
| 2016/0065284 | A1 * | 3/2016 | Yu | H04L 5/0023 370/329 |
| 2016/0116582 | A1 * | 4/2016 | Chang | G01S 7/42 342/25 A |
| 2016/0150591 | A1 * | 5/2016 | Tarighat Mehrabani | H04L 27/18 370/329 |
| 2016/0352396 | A1 * | 12/2016 | Seol | H04B 7/0617 |
| 2018/0288710 | A1 * | 10/2018 | Luo | H04B 7/0623 |
| 2019/0089420 | A1 * | 3/2019 | Koskela | H04B 7/0417 |
| 2019/0098586 | A1 * | 3/2019 | Akkarakaran | H04W 72/1268 |
| 2019/0191397 | A1 * | 6/2019 | Pan | H04W 56/00 |
| 2019/0253986 | A1 * | 8/2019 | Jeon | H04W 72/042 |
| 2019/0319663 | A1 * | 10/2019 | Shimura | H01Q 21/205 |
| 2019/0372652 | A1 * | 12/2019 | Sadiq | H04B 7/0695 |
| 2020/0136711 | A1 * | 4/2020 | Cao | H04B 7/0691 |
| 2020/0145079 | A1 * | 5/2020 | Marinier | H04W 74/0833 |
| 2020/0145987 | A1 * | 5/2020 | Ji | H04W 72/04 |
| 2020/0178350 | A1 * | 6/2020 | Miao | H04W 76/27 |
| 2020/0186308 | A1 * | 6/2020 | Yan | H04L 5/00 |
| 2020/0196161 | A1 * | 6/2020 | Ahn | H04B 7/06 |
| 2020/0314764 | A1 * | 10/2020 | Noh | H04B 7/0695 |
| 2021/0119688 | A1 * | 4/2021 | Enescu | H04B 7/0695 |
| 2021/0175919 | A1 * | 6/2021 | Badic | H04B 7/0408 |
| 2021/0384955 | A1 * | 12/2021 | Varatharaajan | H04B 7/0695 |

FOREIGN PATENT DOCUMENTS

| | | | |
|---|---|---|---|
| JP | 2006-033427 | A | 2/2006 |
| RU | 476 904 | C1 | 2/2013 |
| RU | 2 495 447 | C2 | 10/2013 |
| WO | 2017196612 | A1 | 11/2017 |
| WO | 2018133117 | A1 | 7/2018 |
| WO | 2018/174806 | A1 | 9/2018 |
| WO | 2018/219435 | A1 | 12/2018 |
| WO | 2018224121 | A1 | 12/2018 |

OTHER PUBLICATIONS

Bin, English translation of CN-104937972-A, Chinese Patent Office, Sep. 2015 (Year: 2015).*

International Search Report dated Nov. 21, 2019, issued in International Application No. PCT/EP2019/061029 (6 pages).

Written Opinion of the International Searching Authority dated Nov. 21, 2019, issued in International Application No. PCT/EP2019/061029 (9 pages).

Qualcomm Incorporated, InterDigital, "P-MPR Definition and Use Cases", 3GPP TSG RAN4 #61 (R4-115662), Nov. 14-18, 2011, San Francisco, USA (2 pages).

Intel Corporation, "Enhanced performance alternatives for RF exposure compliance for FR2", 3GPP TSG-RAN WG4 1 Meeting #88, R4-1809838, Gothenburg, Sweden, Aug. 20-24, 2018 (3 pages).

* cited by examiner

BEAM SELECTION SYSTEMS AND METHODS

CROSS REFERENCE TO RELATED APPLICATION(S)

This application is a 35 U.S.C. § 371 National Stage of International Patent Application No. PCT/EP2019/061029, filed Apr. 30, 2019, designating the United States.

TECHNICAL FIELD

Disclosed are embodiments related to selecting a beam from a set of candidate beams.

BACKGROUND

Narrow beam transmission and reception schemes are typically needed at higher frequencies to compensate for high propagation loss. For a given communication link, a beam can be applied at both the transmit/receive point (TRP) (i.e., an access point, such as a base station, or a component of an access point that comprises an antenna arrangement and a radio unit) and a user equipment (UE) (i.e., a communication device, such a smartphone, sensor, appliance, table, etc., capable of wireless communication with a TRP). The pair of beams consisting of the beam applied at the TRP and the beam applied by the UE is referred to as a "beam pair link (BPL)" in this disclosure.

Referring to FIG. 1, a beam management procedure is employed to discover and maintain a TRP 104 beam 112 (e.g., a TRP transmit (TX) beam) and/or a UE 102 beam 116 (e.g., a UE receive (RX) beam). In the example of FIG. 1, one BPL has been discovered (i.e., the beam pair that consists of TRP beam 112 and UE beam 116) and is being maintained by the network. A BPL is expected to mainly be discovered and monitored by the network using measurements on downlink (DL) reference signals (RSs) used for beam management, e.g., a CSI-RS (channel-state-information RS). The CSI-RSs for beam management can be transmitted periodically, semi-persistently or aperiodic (event triggered) and they can be either shared between multiple UEs or be UE-specific. In order to find a suitable TRP TX beam the TRP 104 transmits CSI-RS in different TRP TX beams on which the UE 102 performs RSRP measurements and reports back the N best TRP TX beams (where N can be configured by the network). Furthermore, the CSI-RS transmission on a given TRP TX beam can be repeated to allow the UE to evaluate suitable UE beam (UE RX beam training).

There are basically three different implementations of beamforming, both at the TRP and at the UE: 1) analog beamforming, 2) digital beamforming, and 3) hybrid beamforming. Each implementation has its pros and cons. Digital beamforming is the most flexible solution but also the costliest due to the large number of required radios and baseband chains. Analog beamforming is the least flexible but cheaper to manufacture due to reduced number of radio and baseband chains. Hybrid beamforming is a compromise between the analog and digital beamforming. One type of beamforming antenna architecture that has been agreed to study in 3GPP for the New Radio (NR) access technology is the concept of antenna panels, both at the TRP and at the UE. An antenna panel (or "panel" for short) is an antenna array of single-polarized or dual-polarized antenna elements with typically one transmit/receive unit (TX/RU) per polarization. An analog distribution network with phase shifters is used to steer the beam of each panel. FIG. 2A illustrates an example of a two-dimensional dual-polarized panel and FIG. 2B illustrates an example of a one-dimensional dual-polarized panel, where each panel is connected to one TXRU per polarization.

P2 and P3 Beam Sweeps

It is expected that the determination of a BPL between TRP 104 and UE 102 (i.e. finding a suitable TRP beam and UE beam) starts with a P2 beam sweep, which is illustrated in FIG. 3A. A P2 beam sweep is a process that includes the TRP 104 transmitting CSI-RS in different TRP TX directional beams 303 and the UE 102 measuring RSRP for each of the directional beams (or "beams" for short) in the set of TRP beams 303 (using a fixed UE RX beam 301) and sending back to the TRP 104 the CSI-RS resource index(s) (CRI(s)) corresponding to the highest RSRP(s), where each CRI corresponds to one of the TRP TX beams 303. During such P2 beam sweep it is expected that, for each UE antenna panel, UE 102 will apply a wide beam 301 (a.k.a., a non-directional beam or omni-directional beam) (e.g. the widest beam that the UE is able to generate) so that as many propagation paths as possible between the TRP 104 and the UE 102 are captured by the P2 beam sweep. Following the P2 beam sweep, the TRP is expected to do a P3 beam sweep, which is illustrated in FIG. 3B. A P3 beam sweep is a process that includes the TRP 104 transmitting a burst of CSI-RS in (typically) the best reported TRP TX directional beam from the P2 procedure (which in this example is TRP TX beam 312), which means that the UE 102 can sweep through different UE RX directional beams 305, perform measurements on the CSI-RS and select a preferred UE RX directional beam (e.g., UE RX beam 314). How the UE determine the candidate UE RX beams is up to UE implementation.

Maximum Permissible Exposure (MPE) for FR2

Considering the safety of mmWave radiation exposure to the human body, the United States Federal Communication Commission (FCC) and other regulatory institutes have defined the maximum permissible exposure as the power density in terms of W/m2. To comply with this, RAN4 has started discussing something called Power Management Maximum Power Reduction (P-MPR), which basically tells the amount by which the UE needs to reduce its output power due to RF exposure requirements.

Since transmission at mmWave frequencies is expected to be directional, the allowed output power for the UE would very likely be different among different candidate uplink beams across different UE panels. That means that certain beams, e.g., ones that may be pointing towards human body, may have potentially very high P-MPR while some other beams, e.g., ones of which beam pattern may not coincide human body, may have very low P-MPR.

SUMMARY

Certain challenges exist. During a P2 TRP TX beam sweep, the UE should measure the RSRP for the different candidate TRP TX beams and report the N TRP TX beams with highest RSRP). If beam correspondence is fulfilled at both the TRP and the UE, it is expected that the TRP will configure the UE with UL transmission in the same BPL as is used for DL transmission (i.e., the UE TX beam used for UL transmission is the same as the UE RX beam used for DL transmission). This, however, might lead to a sub-optimal configuration with respect to the UL transmission because the configured UE TX beam might have a large P-MPR. In worst case, due to the potentially large P-MPR for the configured UE TX beam, the configured UE TX beam is not allowed to use sufficient output power to reach UL coverage, which might cause the UE to lose connection with the network.

Accordingly, this disclosure proposes that the UE determines P-MPR for different candidate UE beams. For example, for each candidate beam, the UE determines a value indicative of an amount by which the UE should reduce its output power. Then, during a P2 beam sweep, instead of the UE generating as wide UE RX beam as possible, the UE consider the determined P-MPR for the candidate UE beams and generates a UE RX beam with as large beamwidth as possible, but with the condition to reduce the antenna gain in directions of the UE beams with large P-MPR. This means that the selected best TRP TX beam(s) will not only be selected based on the measured DL RSRP but also take UL link budget due to P-MPR in to account. A significant advantage of this proposal is that the TRP TX beam can be selected taking the UL available output power in to account, which will help the TRP selecting a BPL that is useful both for UL and DL.

In one aspect, therefore, there is provided a method for beam selection, where the method is performed by a UE. The method, in one embodiment, includes the UE, for a first directional beam pointing in a first direction, determining a first power management level, $P_1$, and for a second directional beam pointing in a second direction, determining a second power management level, $P_2$. The method further includes, the UE, using $P_1$ and $P_2$, generating a beam having a first gain in the first direction and having a second gain in the second direction, wherein the first gain is a function of at least $P_1$ and the second gain is a function of at least $P_2$. The method further includes the UE receiving, using the generated beam, downlink reference signals transmitted by a network node.

BRIEF DESCRIPTION OF THE DRAWINGS

The accompanying drawings, which are incorporated herein and form part of the specification, illustrate various embodiments.

DETAILED DESCRIPTION

Figure 1:
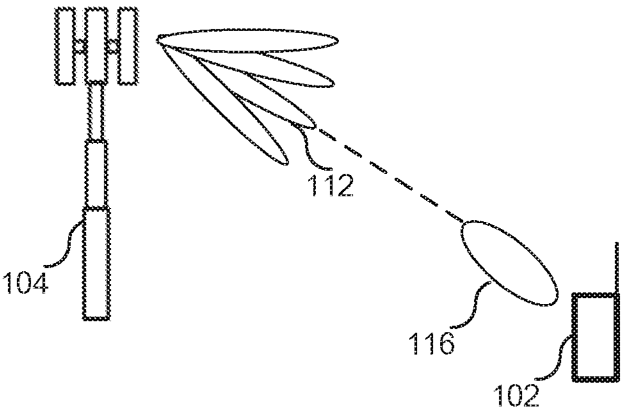
FIG. 1 illustrates a wireless communication system.
Figure 2A:
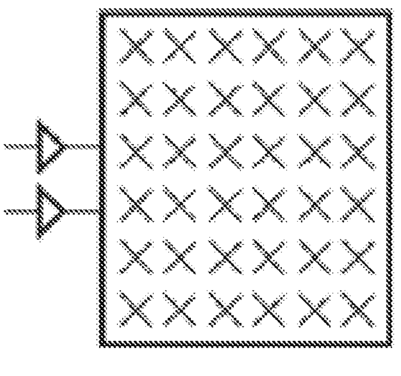
FIG. 2A illustrates an example of a two-dimensional dual-polarized panel.
Figure 2B:
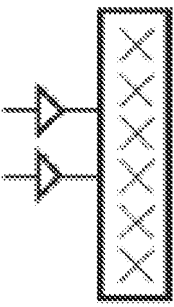
FIG. 2B illustrates an example of a one-dimensional dual-polarized panel.
Figure 3A:
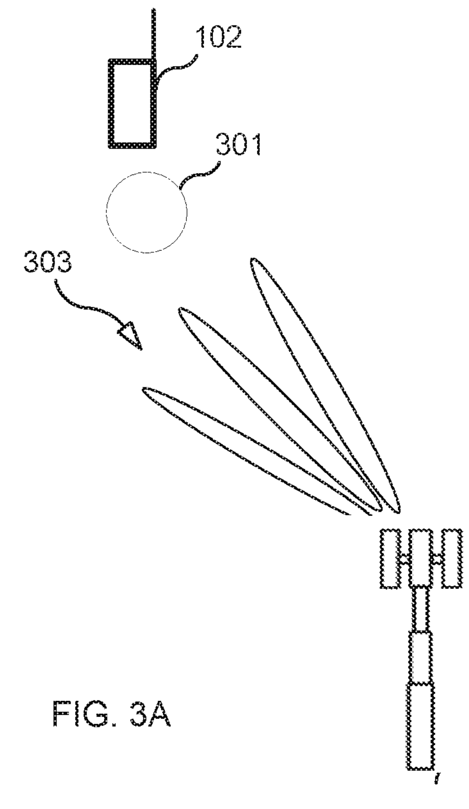
FIG. 3A illustrates a P2 beam sweep.
Figure 3B:
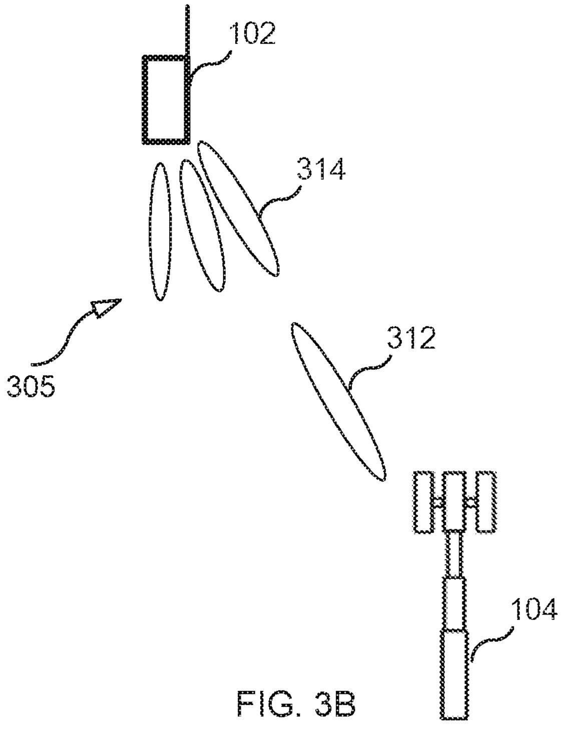
FIG. 3B illustrates a P3 beam sweep.
Figure 4:
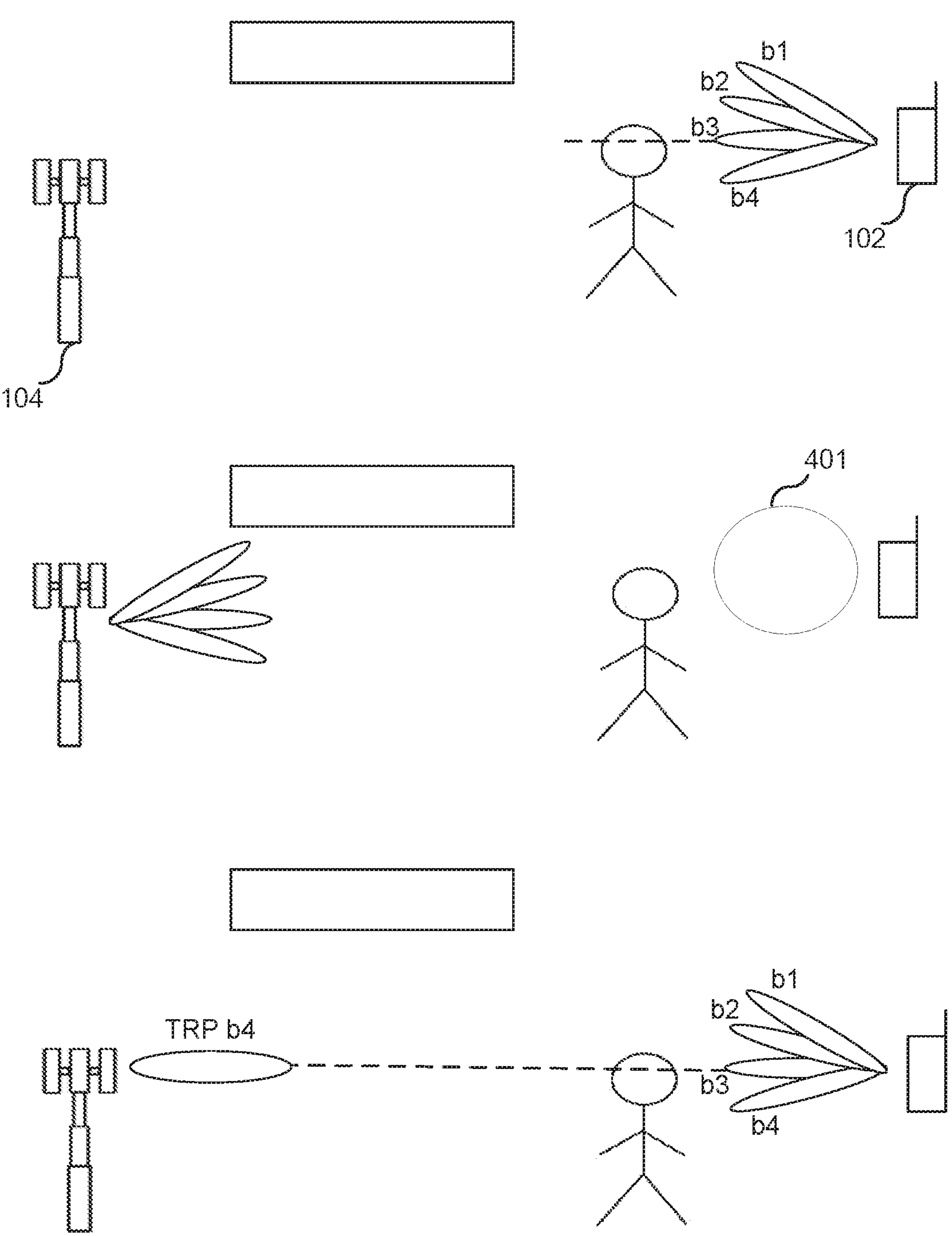
FIG. 4 illustrates a problem with the conventional beam management procedure.

As noted above, if beam correspondence is fulfilled at both the TRP and the UE, then it is possible that the UE is configured to use for UL transmission a UE TX beam having a large P-MPR. This problem is illustrated schematically in FIG. 4. In step 1, the UE 102 determines which UE beams are pointing towards a human body, and therefore which UE beams experience large P-MPR. This could for example be done by using a camera at the UE, proximity sensors, etc. As can be seen, UE beam b3 points right at the human body and therefore has a large P-MPR. In the next step (step 2), the TRP 104 performs a P2 sweep so that the UE can report the best N TRP TX beams (e.g., N greater than or equal to 1). In this case the UE uses a wide UE RX beam 401 that is as wide as possible in order to properly evaluate all different TRP TX beams. Wide beam 401 is also referred to as an omni-directional beam because beam 401 can be used to receive signals arriving at the UE from multiple directions. As can be seen in FIG. 4, the best TRP beam is TRP beam b4 which is using the line-of-sight (LOS) path between the TRP and UE (through the human body). In the next step (step 3) the TRP performs a P3 beam sweep to enable UE 104 find a suitable UE beam. Since only UE beam b3 is pointing in the LOS direction and the other UE beams have very low gain in that direction, the UE has to choose UE beam b3. However, due to the high P-MPR for that beam, the UE might not be able to transmit with high enough output power to fulfil UL coverage.

Accordingly, this disclosure proposes an improved UE 502 (see FIG. 5) that determines P-MPR for different candidate UE beams. Then, during a P2 beam sweep, instead of the UE generating wide UE RX beam 401, the UE considers the determined P-MPR for the candidate UE beams and generates a UE RX beam 501 (see FIG. 5) with as large beamwidth as possible, but with the condition to reduce the antenna gain in directions of the UE beams with large P-MPR. That is, like beam 401, beam 501 is omni-directional, but, for each of the directions associated with high P-MPR, the antenna gain is reduced compared to the antenna gain for the other directions. This means that the selected best TRP TX beam(s) will not only be selected based on the measured DL RSRP but also take UL link budget due to P-MPR in to account.

Figure 5:
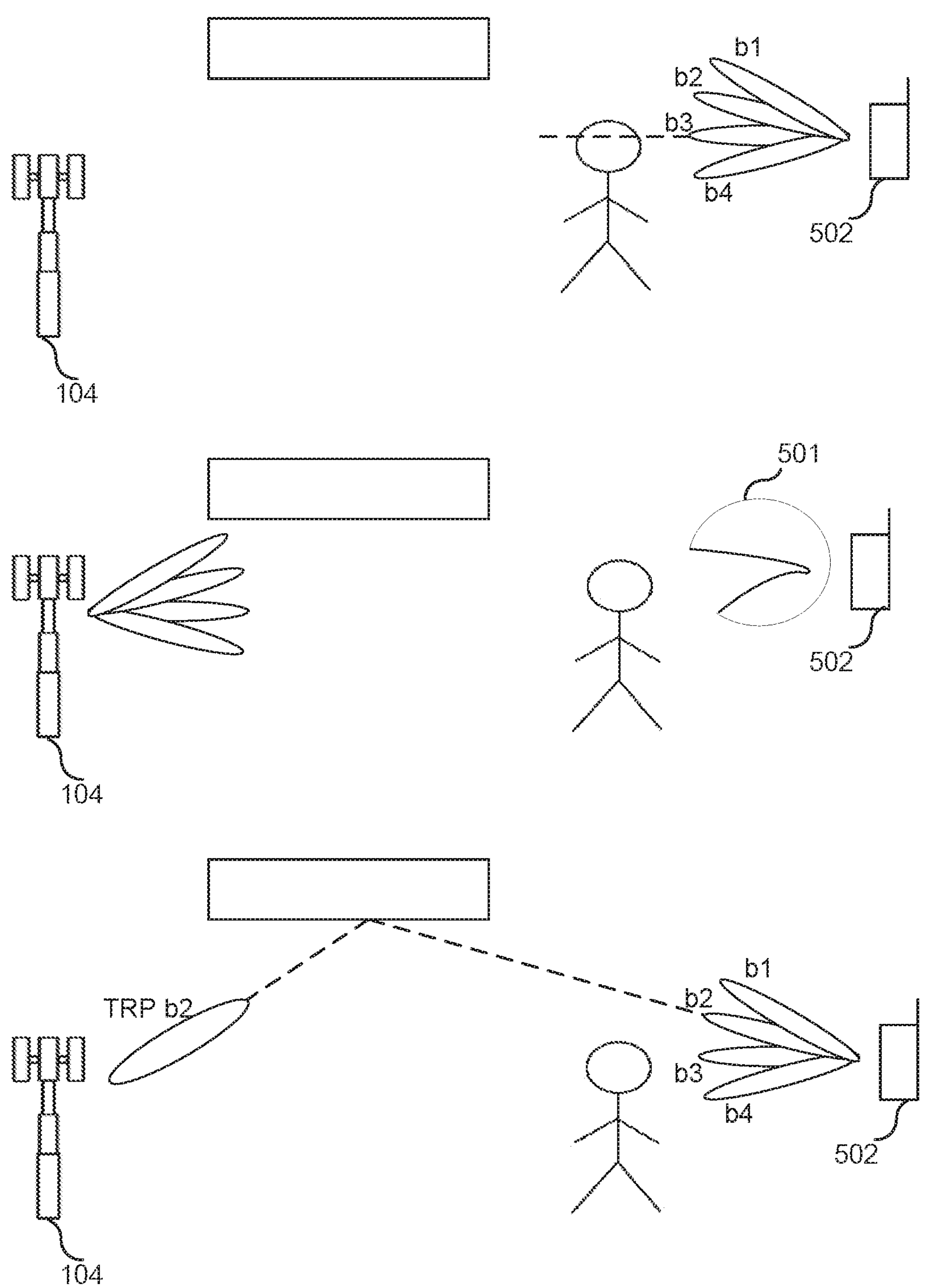
FIG. 5 illustrates a process according to an embodiment.

FIG. 5 provides an illustration of the above described process. Prior to the start of a P2 beam sweep, UE 502, for each UE beam included in a set of candidate UE beams, determines whether the UE beam is pointing towards a human body. In this way, UE 502 is therefore able to determine which UE beams have a large P-MPR. This could for example be done by using a camera at the UE, proximity sensors, etc. As can be seen, UE beam b3 points right at the human body and therefore has large P-MPR.

Next, the TRP 104 serving UE 502 initiates a P2 beam sweep. But now, instead of the UE applying wide UE RX beam 401, UE 502 creates beam 501 that, in one embodiment, is as wide as possible but with suppressed gain in direction of the UE beam(s) with large P-MPR (UE beam b3 in this example). In one embodiment UE 502 consider how large the P-MPR is, and the larger P-MPR is, the more UE 502 suppresses UE beam gain in that direction.

Non-limiting examples of how the UE 502 might generate the beam 501 are provided below. For example, as disclosed above, for each UE beam included in a set of N candidate UE beams (N>1), UE 502 determines whether the UE beam is pointing towards a human body. The beams in this set of candidate set may be described by a set of receiver beam vectors $$\{f_1, f_2 \ldots f_N\} = \{f_i\}_{i=1}^{N},$$

which for instance might constitute orthogonal Discrete Fourier Transform (DFT) vectors. The UE 502 is for illustrative purposes assumed to have determined a P-MPR level $P_i$ associated with each receiver beam i in the candidate set. For example, assume: i) beam i is pointing directly at a person's head and the person's head is close to the UE, ii) beam j is pointing directly at another person's head but this person's head is not close to the UE, and iii) beam k is not pointing at any person at all, then it could be the case that: $P_i>P_j>P_k$. If the N beam vectors in the set constitute an orthogonal (and optionally rotated) DFT basis and the antenna panel of the UE 502 can be described as a uniform linear array (ULA), the average of the receiver beam vectors in the set $$f_{AVG} = \sum_{i=1}^{N} f_i$$

have a wide beam characteristic. One way to generate the beam 501 with suppressed gain in directions of high P-MPR is then to weight the receiver beam vector in the sum with the inverse of the associated P-MPR level, i.e.

$$f_{wide,sup} = \sum_{i=1}^{N} W_i f_i, \text{ where } W_i = 1/P_i.$$

Another way to generate the beam 501 with suppressed gain in directions of high P-MPR is to set $W_i=0$ if $P_i$ is greater than a threshold, otherwise set $W_i=1$.

Generally, according to an embodiment, the candidate set of at least two directional beams is defined by a first set of beam vectors. The generated beam might then be generated from the first candidate set of at least two directional beams by weighting the first set of beam vectors according to the P-MPR per beam in the candidate set of directional beams. In other words, the more P-MPR the beam experiences, the less weight (i.e., the smaller the magnitude of the weight) it should have.

Using beam 501, UE 502 determines that, as shown in FIG. 5, the best TRP beam in this case is TRP beam b4 which is using a non-LOS path between the TRP and UE.

After the best TRP beam is found, the TRP may perform a P3 beam sweep to enable UE 502 to find a suitable UE beam. Since only UE beam b2 is pointing in direction of the non-LOS path, UE 502 will choose UE beam b2 for subsequent transmission. Since UE beam b2 is not pointing towards the human body, UE 502 can utilize maximum allowed output power for this beam.

Figure 6:
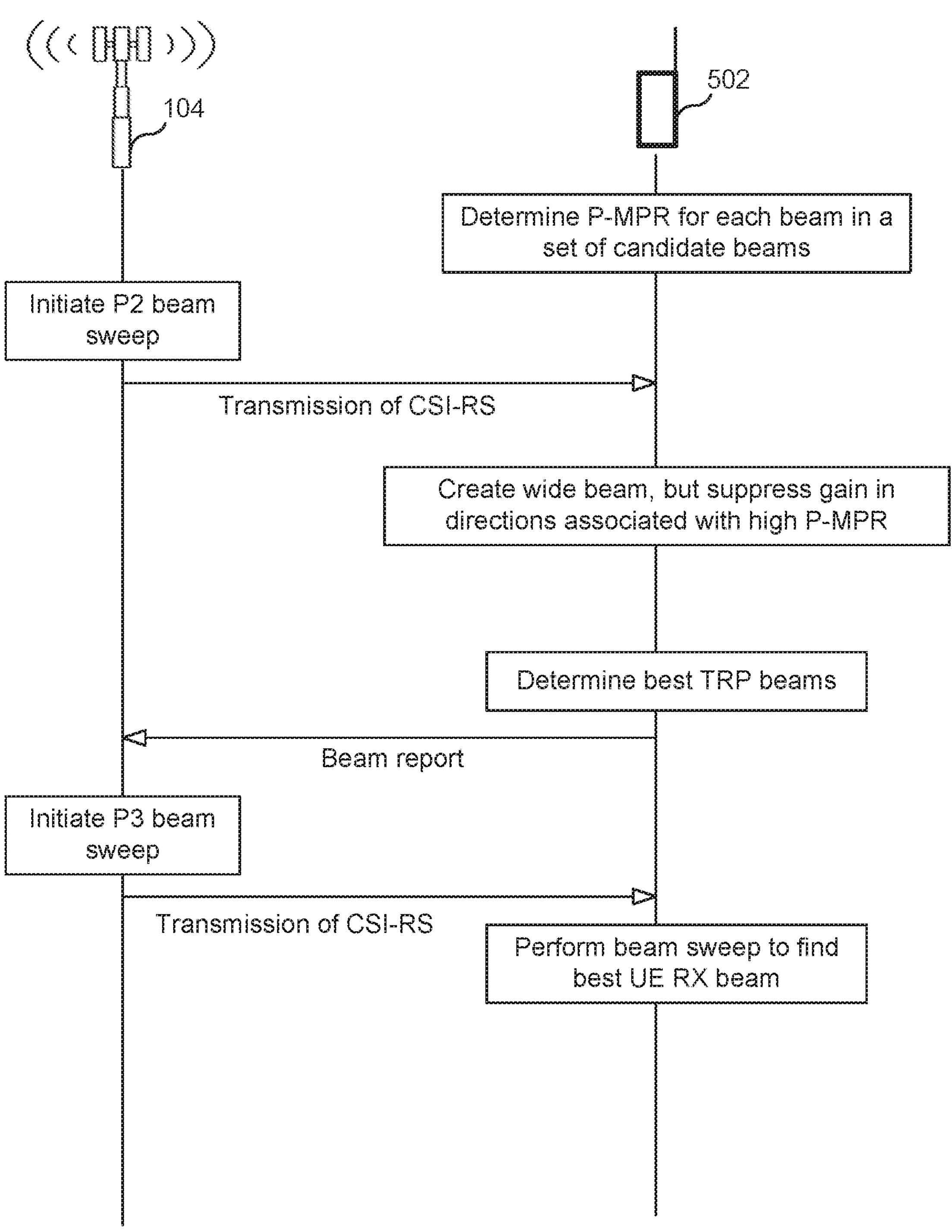
FIG. 6 is a message flow diagram illustrating a process according to an embodiment.

FIG. 6 is a message flow diagram illustrating the above process. In a first step UE 502 determines which UE beams that is pointing towards human body, and therefore which UE beams that experiences large P-MPR. UE 502 then determines a UE RX beam with suppressed gain in directions of UE 502 beam(s) with large P-MPR. In the next step the TRP performs the P2 beam sweep and UE 502 applies the new UE RX beam when receiving the CSI-RSs. UE 502 then reports back the CRI(s) corresponding to the best TRP TX beam(s) measured with the new UE RX beam. The TRP then performs a P3 beam sweep and UE 502 sweeps through a set of candidate UE RX beams. In one embodiment, the set of candidate UE RX beams does not include any of the UE beams having a large P-MPR (e.g., the beams pointing in direction of a person, and in that way only evaluates beam that do not have too large P-MPR.

Figure 7:
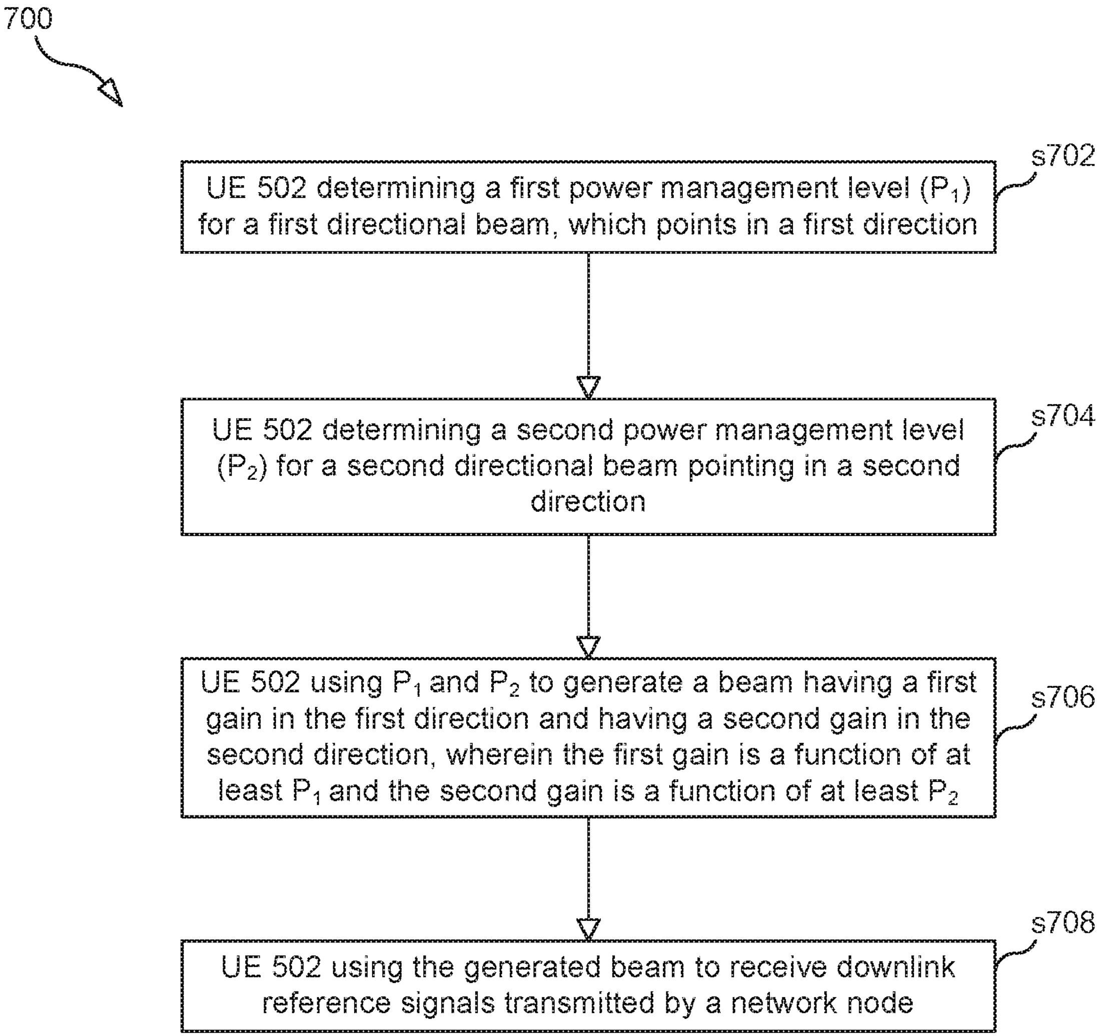
FIG. 7 is a flowchart illustrating a process according to an embodiment.

FIG. 7 is a flowchart illustrating a process 700 according to an embodiment. Process 700 may begin with step s702.

Step s702 comprises UE 502 determining a first power management level ($P_1$) (e.g., an amount by which output power should be reduced) for a first directional beam (e.g., beam b1), which points in a first direction.

Step s704 comprises UE 502 determining a second power management level ($P_2$) for a second directional beam (e.g., beam b3) pointing in a second direction.

Step s706 comprises UE 502 using $P_1$ and $P_2$ to generate a beam (e.g., beam 501) having a first gain in the first direction and having a second gain in the second direction, wherein the first gain is a function of at least $P_1$ and the second gain is a function of at least $P_2$.

Step s708 comprises UE 502 using the generated beam 501 to receive downlink reference signals transmitted by a network node (e.g., TRP 104).

In some embodiments, determining $P_1$ comprises determining whether the first directional beam points in a direction of a person, and determining $P_2$ comprises determining whether the second directional beam points in a direction of a person. Preferably, the first gain is higher than the second gain if it is determined that a) the first directional beam does not point in the direction of a person and b) the second directional beam points in the direction of a person.

In some embodiments, the first and second directional beams are included in a set of N candidate beams, wherein N is greater than or equal to two and the set of candidate beams is represented by a corresponding set of receiver beam vectors $\{f_1, f_2, \ldots f_N\}$, wherein $f_1$ corresponds to the first directional beam and $f_2$ corresponds to the second directional beam, generating the beam comprises calculating $W_1 \times f_1$ and calculating $W_2 \times f_2$, $W_1$ is a function of $P_1$, and $W_2$ is a function of $P_2$. In some embodiments, generating the beam comprises calculating:

$$\sum_{i=1}^{N} W_i f_i,$$

wherein, for i=1 to N, $W_i$ is a function of $P_i$ and $P_i$ is a determined power management level for the i-th beam in the set of N candidate beams. In some embodiments, for i=1 to N, $W_i=1/P_i$, whereas in other embodiments, for i=1 to N, $W_i=1$ if $P_i$ is less than a threshold and $W_i=0$ if $P_i$ is greater than the threshold.

In some embodiments, using the generated beam to receive the downlink reference signals transmitted by the network node comprises: using the generated beam to receive a reference signal transmitted by the network node using a first candidate TX directional beam; and using the generated beam to receive a reference signal transmitted by the network node using a second candidate TX directional beam. In some embodiments, process 700 also includes the following steps: UE 502 obtaining, based on the reference signal transmitted by the network node using the first candidate TX directional beam, a first received reference signal power value, PV1; UE 502 using PV1 to assign a rank to the first candidate TX directional beam; UE 502 determining, based on the rank assigned to the first candidate TX directional beam, whether or not to include in a beam report a beam indicator (e.g., a CRI) indicating the first candidate TX directional beam; and UE 502 transmitting the beam report to the network node.

Figure 8:
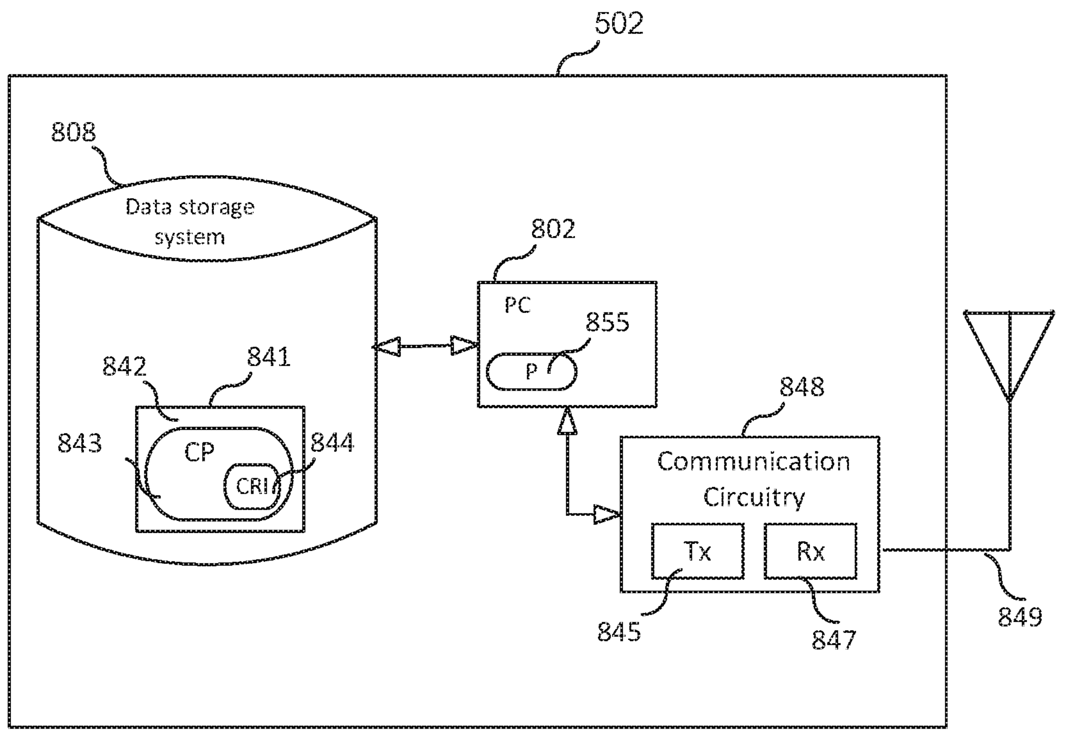
FIG. 8 is a block diagram of a UE according to an embodiment.

FIG. 8 is a block diagram of UE 502, according to some embodiments. As shown in FIG. 8, UE 502 may comprise: processing circuitry (PC) 802, which may include one or more processors (P) 855 (e.g., one or more general purpose microprocessors and/or one or more other processors, such as an application specific integrated circuit (ASIC), field-programmable gate arrays (FPGAs), and the like); communication circuitry 848, which is coupled to an antenna arrangement 849 comprising one or more antennas and which comprises a transmitter (Tx) 845 and a receiver (Rx) 847 for enabling UE 502 to transmit data and receive data (e.g., wirelessly transmit/receive data); and a local storage unit (a.k.a., "data storage system") 808, which may include one or more non-volatile storage devices and/or one or more volatile storage devices. In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some embodiments, the CRI 844 of computer program 843 is configured such that when executed by PC 802, the CRI causes UE 502 to perform steps described herein (e.g., steps described herein with reference to the flow charts). In other embodiments, UE 502 may be configured to perform steps described herein without the need for code. That is, for example, PC 802 may consist merely of one or more ASICs. Hence, the features of the embodiments described herein may be implemented in hardware and/or software.

Figure 9:
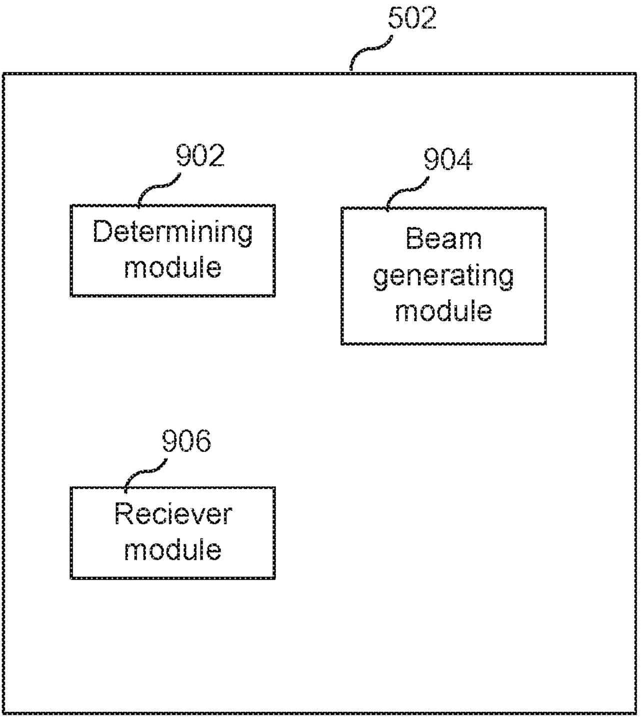
FIG. 9 is a modular block diagram of the UE according to an embodiment.

FIG. 9 is a schematic block diagram of UE 502 according to some other embodiments. UE 502 in some embodiments includes one or more modules, each of which is implemented in software. The module(s) provide the functionality described herein (e.g., the steps herein, e.g., with respect to FIG. 7). In one embodiment, the modules include: a determining module 902 configured to determine a first power management level, $P_1$, for a first directional beam (e.g., b1, b2, or b4) pointing in a first direction and determine a second power management level, $P_2$, for a second directional beam (e.g., b3) pointing in a second direction; a beam generating module 904 configured to use $P_1$ and $P_2$ to generate a beam (e.g., beam 501) having a first gain in the first direction and having a second gain in the second direction, wherein the first gain is a function of at least $P_1$ and the second gain is a function of at least $P_2$; and a receiver module 906 configured to use the generated beam to receive downlink reference signals transmitted by a network node (e.g., TRP 104).

While various embodiments of the present disclosure are described herein, it should be understood that they have been presented by way of example only, and not limitation. Thus, the breadth and scope of the present disclosure should not be limited by any of the above-described exemplary embodiments. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. That is, the steps of any methods disclosed herein do not have to be performed in the exact order disclosed, unless a step is explicitly described as following or preceding another step and/or where it is implicit that a step must follow or precede another step.

The invention claimed is:

1. A method for beam selection, the method being performed by a user equipment (UE), the method comprising:

for a first directional beam pointing in a first direction, the UE determining a first power reduction value indicating a first amount of power reduction, wherein the first power reduction value is a value greater than 0 and specifies a first positive reduction in power;

for a second directional beam pointing in a second direction, the UE determining a second power reduction value, wherein the second power reduction value is lower than the first power reduction value and greater than or equal to 0;

the UE generating a receive (Rx) beam using the first power reduction value and the second power reduction value, wherein:

the generated Rx beam has a first gain in the first direction, the generated Rx beam has a second gain in the second direction, the first gain is a function of at least the first power reduction value, the second gain is a function of at least the second power reduction value, and the first gain is lower than the second gain; and receiving, using the generated Rx beam, downlink reference signals transmitted by a network node.

2. The method of claim 1, wherein determining the first power reduction value comprises determining whether the first directional beam points toward any person, and determining the second power reduction value comprises determining whether the second directional beam points toward any person.

3. The method of claim 2, wherein the UE determines that the first beam points in the direction of a person, the UE determines that the second beam does not point toward any person, and as a result of the UE determining that i) the first beam points in the direction of a person and ii) the second beam does not point toward any person, the second gain is higher than the first gain.

4. The method of claim 1, wherein the first and second directional beams are included in a set of N candidate beams, wherein N is not less than four and the set of candidate beams is represented by a corresponding set of receiver beam vectors $\{f_1, f_2, \ldots f_N\}$, wherein fi corresponds to the first directional beam and $f_2$ corresponds to the second directional beam, generating the beam comprises calculating $W_1 \times f_1$ and calculating $W_2 \times f_2$, $W_1$ is calculated using the first power reduction value, and $W_2$ is calculated using the second power reduction value.

5. The method of claim 4, wherein generating the beam comprises calculating:

$$\sum_{i=1}^{N} W_i f_i,$$

wherein, for 1=1 to N, $W_i$ is a function of $P_i$ and $P_i$ is a determined power reduction value for the i-th beam in the set of N candidate beams.

6. The method of claim 5, wherein, for i=1 to N, $W_i$=1/Pi.

7. The method of claim 5, wherein, for i=1 to N, $W_i$=1 if $P_i$ is less than a threshold and $W_i$=0 if $P_i$ is greater than the threshold.

8. The method of claim 1, wherein using the generated beam to receive the downlink reference signals transmitted by the network node comprises:

using the generated beam to receive a reference signal transmitted by the network node using a first candidate TX directional beam; and using the generated beam to receive a reference signal transmitted by the network node using a second candidate TX directional beam.

9. The method of claim 8, further comprising:

obtaining, based on the reference signal transmitted by the network node using the first candidate TX directional beam, a first received reference signal power value, PV1;

using PV1 to assign a rank to the first candidate TX directional beam;

determining, based on the rank assigned to the first candidate TX directional beam, whether or not to include in a beam report a beam indicator indicating the first candidate TX directional beam; and transmitting the beam report to the network node.

10. A computer program product comprising a non-transitory computer readable medium storing a computer program comprising instructions which when executed by processing circuitry of a user equipment causes the user equipment to perform the method of claim 1.

11. A user equipment, the user equipment (UE) comprising:

a receiver;

memory; and processing circuitry operable to read data from the memory, wherein the UE is configured to perform a process comprising:

for a first directional beam pointing in a first direction, determining a first power reduction value ($P_1$) indicating a first amount of power reduction, wherein the first power reduction value is a value greater than 0 and specifies a first positive reduction in power;

for a second directional beam pointing in a second direction, determining a second power reduction value ($P_2$), wherein the second power reduction value is lower than the first power reduction value and greater than or equal to 0;

generating a receive (Rx) beam using the first power reduction value and the second power reduction value, wherein:

the generated Rx beam has a first gain in the first direction, the generated Rx beam has a second gain in the second direction, the first gain is a function of at least the first power reduction value, the second gain is a function of at least the second power reduction value, and the first gain is lower than the second gain; and using the generated Rx beam and a receiver to receive downlink reference signals transmitted by a network node.

12. The UE of claim 11, wherein the UE is adapted to determine $P_1$ by performing a process that comprises determining whether the first directional beam points toward any person, and the UE is adapted to determine $P_2$ by performing a process that comprises determining whether the second directional beam points toward any person.

13. The UE of claim 12, wherein the first gain is higher than the second gain if it is determined that a) the first directional beam does not point toward any person and b) the second directional beam points toward at least one person.

14. The UE of claim 11, wherein the first and second directional beams are included in a set of N candidate beams, wherein N is not less than four and the set of candidate beams is represented by a corresponding set of receiver beam vectors $\{f_1, f_2, \ldots f_N\}$, wherein fi corresponds to the first directional beam and $f_2$ corresponds to the second directional beam, the UE is adapted to generate the beam by performing a process that comprises calculating Wix fi and calculating $W_2 \times f_2$, $W_1$ is a function of $P_1$, and $W_2$ is a function of $P_2$.

15. The UE of claim 14, wherein the UE is adapted to generate the beam by preforming a process that comprises calculating:

$$\sum_{i=1}^{N} W_i f_i,$$

wherein, for i≤1 to N, $W_i$ is a function of $P_i$ and $P_i$ is a determined power reduction value for the i-th beam in the set of N candidate beams.

16. The UE of claim 15, wherein, for i=1 to N, $W_i$=1/Pi.

17. The UE of claim 15, wherein, for i=1 to N, $W_i$=1 if $P_i$ is less than a threshold and $W_i$=0 if $P_i$ is greater than the threshold.

18. The UE of claim 11, wherein the UE is adapted to use the generated Rx beam to receive the downlink reference signals transmitted by the network node by performing a process that comprises:

using the generated Rx beam to receive a reference signal transmitted by the network node using a first candidate TX directional beam; and using the generated Rx beam to receive a reference signal transmitted by the network node using a second candidate TX directional beam.

19. The UE of claim 18, wherein the UE is further adapted to:

obtain, based on the reference signal transmitted by the network node using the first candidate TX directional beam, a first received reference signal power value, PV1;

use PV1 to assign a rank to the first candidate TX directional beam;

determine, based on the rank assigned to the first candidate TX directional beam, whether or not to include in a beam report a beam indicator indicating the first candidate TX directional beam; and transmit the beam report to the network node.

20. The method of claim 4, wherein generating the beam comprises calculating:

$$(W_1 \times f_1) + (W_2 \times f_2).$$

21. The method of claim 1, wherein the generated beam is a non-directional beam.

22. The method of claim 1, wherein the width of the generated beam is greater than the width of the first directional beam, and the width of the generated beam is greater than the width of the second directional beam.

23. The method of claim 1, wherein determining the first power reduction value comprises:

determining whether the first directional beam points toward a person;

as a result of determining that the first directional beam points toward a person, determining a distance between the person and the first UE; and determining the first power reduction value based on the determined distance.

24. The method of claim 1, wherein the generated Rx beam is an omni-directional beam and the first gain is suppressed as a result of the first power reduction value exceeding a threshold.

25. A method for beam selection, the method being performed by a user equipment, UE, the method comprising:

for each candidate beam vector included in a set of N candidate beam vectors, where N is not less than four, determining a Power Management Maximum Power Reduction (P-MPR) level for the candidate beam vector, thereby determining N P-MPR levels, one for each candidate beam vector, wherein each candidate beam vector produces a beam that points in a different direction such that a first candidate beam vector produces a first candidate beam that points in a first direction, a second candidate beam vector produces a second candidate beam that points in a second direction, a third candidate beam vector produces a third candidate beam that points in a third direction, and a fourth candidate beam vector produces a fourth candidate beam that points in a fourth direction, and each P-MPR level is associated with one of the directions;

for each candidate beam vector, determining a weight for the candidate beam vector based on the P-MPR level determined for the candidate beam vector, thereby determining N weights, one for each candidate beam vector;

using the N candidate beam vectors and the N weights, generating an omni-directional beam such that the generated omni-directional beam has suppressed gains in directions associated with candidate beam vectors having a P-MPR level that exceeds a threshold; and receiving, using the generated omni-directional beam, downlink reference signals transmitted by a network node.

26. A method for beam selection, the method being performed by a user equipment (UE), the method comprising:

associating a first power reduction value with a first direction;

associating a second power reduction value with a second direction, wherein the second power reduction value specifies a reduction in power and the second power reduction value is higher than the first power reduction value;

associating a third power reduction value with a third direction, wherein the third power reduction value is equal to or less than the first power reduction value;

obtaining a first weight value using the first power reduction value;

obtaining a second weight value using the second power reduction value, wherein the second weight value is less than the first weight value;

obtaining a third weight value using the third power reduction value, wherein the third weight value is equal to the first weight value;

the UE using the first weight value obtained using the first power reduction value, the second weight value obtained using the second power reduction value, and the third weight value obtained using the third power reduction value to produce an omni-directional receive (Rx) beam having a first gain in the first direction and the third direction and a second gain in the second direction, wherein the second gain is lower than the first gain;

receiving, using the generated omni-directional Rx beam, a first downlink reference signal transmitted by a network node using a first transmit (Tx) beam;

determining a first received power of the first downlink reference signal; and receiving, using the generated omni-directional Rx beam, a second downlink reference signal transmitted by a network node using a second Tx beam;

determining a second received power of the second downlink reference signal;

transmitting to the network node a report identifying the second Tx beam as a result of determining that the second received power is greater than the first received power;

receiving, using a first uni-directional Rx beam, a third downlink reference signal transmitted by the network node using the second Tx beam;

determining a third received power of the third downlink reference signal;

receiving, using a second uni-directional Rx beam, a fourth downlink reference signal transmitted by the network node using the second Tx beam;

determining a fourth received power of the fourth downlink reference signal; and selecting the second uni-directional Rx beam as a result of determining that the fourth received power is greater than the third received power.

* * * * *